US007012352B2

(12) United States Patent
Fujita et al.

(10) Patent No.: US 7,012,352 B2
(45) Date of Patent: Mar. 14, 2006

(54) MOTOR

(75) Inventors: Youichi Fujita, Tokyo (JP); Sotsuo Miyoshi, Tokyo (JP); Satoru Hasegawa, Tokyo (JP); Katsunori Takai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 41 days.

(21) Appl. No.: 10/468,205

(22) PCT Filed: Aug. 30, 2002

(86) PCT No.: PCT/JP02/08762

§ 371 (c)(1),
(2), (4) Date: Aug. 18, 2003

(87) PCT Pub. No.: WO03/019749

PCT Pub. Date: Mar. 6, 2003

(65) Prior Publication Data

US 2004/0070292 A1 Apr. 15, 2004

(30) Foreign Application Priority Data

Aug. 31, 2001 (JP) ............................ 2001-263225

(51) Int. Cl.
*H02K 13/00* (2006.01)

(52) U.S. Cl. ........................................ 310/239; 310/88

(58) Field of Classification Search ................ 310/239, 310/240, 242, 233, 88
See application file for complete search history.

(56) References Cited

U.S. PATENT DOCUMENTS

| | | | | |
|---|---|---|---|---|
| 5,185,544 A * | 2/1993 | Takada | ........................ | 310/58 |
| 5,914,159 A | 6/1999 | Kato | | |
| 6,097,128 A * | 8/2000 | Ko | ............................ | 310/239 |
| 6,396,175 B1 * | 5/2002 | Fujita et al. | .................. | 310/51 |

FOREIGN PATENT DOCUMENTS

| | | | |
|---|---|---|---|
| JP | 52-149309 | 12/1977 | |
| JP | 57-177252 A | * 10/1982 | |
| JP | 63-24958 | 2/1988 | |
| JP | 401303042 | * 12/1989 | ................ 310/239 |
| JP | 5-79490 | 3/1993 | |
| JP | 2000-71335 A | 3/2000 | |
| JP | 2000-213684 A | 3/2000 | |
| JP | 2000-215252 | 4/2000 | |
| WO | WO 01/37402 | 5/2001 | |
| WO | WO 01/37409 | 5/2001 | |

OTHER PUBLICATIONS

CD-ROM of the specification and drawings annexed to the request of Japanese Utility Model Application No. 65953/1993 (Laid-open 30563/1995) Sankyo Seiki Mfg. Co., Ltd.) Jun. 6, 1995.

(Continued)

*Primary Examiner*—Darren Schuberg
*Assistant Examiner*—Nguyen Hanh
(74) *Attorney, Agent, or Firm*—Sughrue Mion, PLLC

(57) ABSTRACT

Powder produced by abrasion due to sliding between a brush and a commutator is prevented from moving toward a rotor. A recess is provided between the rotor and a slide face of the brush and the commutator, where powder produced by abrasion at the brush may enter into a motor and increase sliding resistance of the rotor. Thus, there is no such powder produced by abrasion entering into the motor as increasing sliding resistance of the rotor.

7 Claims, 24 Drawing Sheets

OTHER PUBLICATIONS

Microfilm of the specification and drawings annexed to the request of Japanese Utility Model application No. 58969/1981 (Laid-open No. 170660/1982) (Mitsubishi Electric Corp.), Oct. 27, 1982.

CD-ROM of the specification and drawings annexed to the request of Japanese Utility Model Application No. 12357/1992 (Laid-open No. 74158/1993) Shibaura Engineering Works Co., Ltd.).

* cited by examiner

MOTOR

TECHNICAL FIELD

The present invention relates to a motor, which is used as direct-current motor for driving a valve of a vehicle-mounted EGR-V (Exhaust Gas Recirculation Valve) or the like.

BACKGROUND ART

Motors disclosed in the International Publication Nos. PCT01/37402 and PCT01/37409 are known as conventional motors, particularly motors used in an EGR-V.

However, in such conventional motors, an upper face of a stator is formed into an approximately flat surface. Therefore, there is a possibility that powder produced by abrasion at a brush falls on the upper face of the stator, gradually moves inside, and enters from a motor shaft part into the motor (especially into a bearing holding portion of the stator). This eventually results in increase in sliding resistance of a rotor.

In order to secure air-tightness in lower part of the stator, any fluid sealant is sandwiched between the stator and the boss at a space formed between the stator portion and a boss portion fitted thereinto. However, the face to which the fluid sealant is applied is flat, and this brings about a disadvantage that a joint gap is formed due to irregular configuration in the flat surface and a minute change in configuration after continuous operation, thereby losing air-tightness.

The position sensor portion is fixed to the stator portion by welding (hot wire method). In this hot wire method, two parts (in this case, the position sensor portion and the stator portion) forming a nested structure (rough portion to be welded) are joined together by application of a current to a wire set between the two parts. Thus, a heat is generated and a resin is fused (see the Japanese Patent Publication (unexamined) No. 2000-006247).

Such a conventional art, however, has a disadvantage that the resin overflows at the time of welding due to dimensional irregularity in the rough portion to be welded, and leakage (poor air-tightness) occurs in the space between butt parts depending upon the manner the wire is set.

Moreover, in the conventional motor, a coil is wound and ended at the base portion of a terminal led from a stator core. In the case where the terminal and the winding (coil) are joined together by soldering, it is essential to soak the whole terminal in solder, and as a result, the whole terminal is unnecessarily soldered. This causes a disadvantage that the-solder flows out of a portion molded in a mold at the time of molding the stator core, and the soldering is carried out while shaving off the solder sticking to the terminal. Consequently, a problem exists in that solder shavings are accumulated in the mold and are mixed with the resin.

As discussed above, in the conventional motor, a problem exists in that powder is produced by abrasion at the brush, and enters into the motor, thereby increasing the sliding resistance of the rotor.

Another problem exists in that a joint gap occurs due to irregular configurations of the flat surface part at the space between the stator portion and the boss portion fitted into the stator portion and to a minute change in configuration after a continuous operation, eventually resulting in losing air-tightness.

A further problem exists in that, at the time of welding the position sensor portion and the stator portion together by hot wire method, the resin overflows due to dimensional irregularity of the welded portion. Thus, leakage (poor air-tightness) occurs at the gap between butt parts depending upon the manner of setting the wire.

A still further problem exists in that the soldering is carried out while shaving off the solder sticking to the terminal and, as a result, solder shavings are accumulated in the mold and are mixed with the resin.

The present invention has an object of providing a motor capable of preventing powder produced by abrasion at a brush from entering in the motor.

The invention has another object of providing a motor capable of improving air-tightness in a space between a stator portion and a boss portion fitted into the stator portion.

The invention has a further object of providing a motor capable of preventing leakage of resin at a portion where the position sensor portion and the stator portion are welded together.

The invention has a yet further object of providing a motor capable of preventing solder shavings accumulating in the mold at the time of molding the stator core.

DISCLOSURE OF INVENTION

A motor according to the invention includes: a brush; a commutator onto which this brush comes in contact and slides; a core round which a coil is wound through a bobbin and in which a magnetic field is generated by applying an electric current from the brush to the coil; and a rotor provided with a magnet. In this motor, a recess is formed between a slide face of the brush and the commutator and the rotor in order to prevent powder produced by abrasion due to sliding between the brush and commutator from moving to the rotor. As a result, it is possible to prevent powder produced by abrasion at the brush from entering in the motor.

The recess is preferably disposed circumferentially around a bearing portion of the rotor. As a result, it is possible to prevent the powder produced by abrasion from entering in the shaft portion of the rotor.

Another motor includes: a core round which a coil is wound through a bobbin and in which a magnetic field is generated by applying an electric current to the coil; a stator formed by integrally molding the coil, bobbin and core; a rotor provided with a magnet; and a boss supporting an end of this rotor and tightly shielding a space between the rotor and the stator from one end side of the rotor. In this motor, both boss and stator are partially provided with irregularities at a part of a contact face between them. As a result, it is possible to improve air-tightness between the boss and the stator.

Either a sealant or an adhesive is applied to the contact face where both boss and stator are provided with irregularities. As a result, it is possible to further improve the air-tightness.

A further motor includes: a core round which a coil is wound through a bobbin and in which a magnetic field is generated by applying an electric current to the coil; a stator formed by integrally molding the coil, bobbin and core; a rotor provided with a magnet; and a cover made of a resin that covers tightly an end of the stator by being welded to the end of the stator. In this motor, after disposing a resistance wire in a groove provided on the stator and inserting a protruding part of the cover in this groove, an electric current is applied to the resistance wire, thus, the stator and the cover are welded together. Further, in the motor, a recess is provided around the protruding part of the cover in a direction opposite to the protruding part. As a result, it is possible to prevent any fused resin flowing out of the space between the cover and the stator at the time of welding.

A still further motor includes: a core round which a coil is wound through a bobbin and in which a magnetic field is generated by applying an electric current to the coil; a stator formed by integrally molding the coil, bobbin and core; a rotor provided with a magnet; and a cover made of a resin that covers tightly one end of the stator by being welded to the end of the stator. In this motor, after disposing a resistance wire in a groove provided on the stator and inserting a protruding part of the cover in this groove, an electric current is applied to the resistance wire, thus the stator and the cover are welded together. Further, in this motor, a protruding part is provided along the resistance wire at a port for leading out and connecting the resistance wire to an outside power supply. As a result, it is possible to improve air-tightness around the resistance wire.

A yet further motor includes: a brush; a commutator onto which this brush comes in contact and slides; a core round which a coil is wound through a bobbin and in which a magnetic field is generated by applying an electric current from the brush to the coil; a rotor provided with a magnet; and a terminal which is fixed to the bobbin, and to which the coil is soldered; a stator formed by integrally molding the coil, the bobbin, and the core; and a protruding part which is formed by bending from the terminal, and to which the coil is soldered. As a result, it is possible to facilitate the soldering process and prevent the soldering from being shaved off by the mold at the time of molding the stator.

The protruding part is preferably provided with a cutout part, which makes it easily to wind the coil round the terminal.

BEST MODE FOR CARRYING OUT THE INVENTION

Best modes for carrying out this invention are hereinafter described in detail with reference to the accompanying drawings.

Embodiment 1

Figure 1:
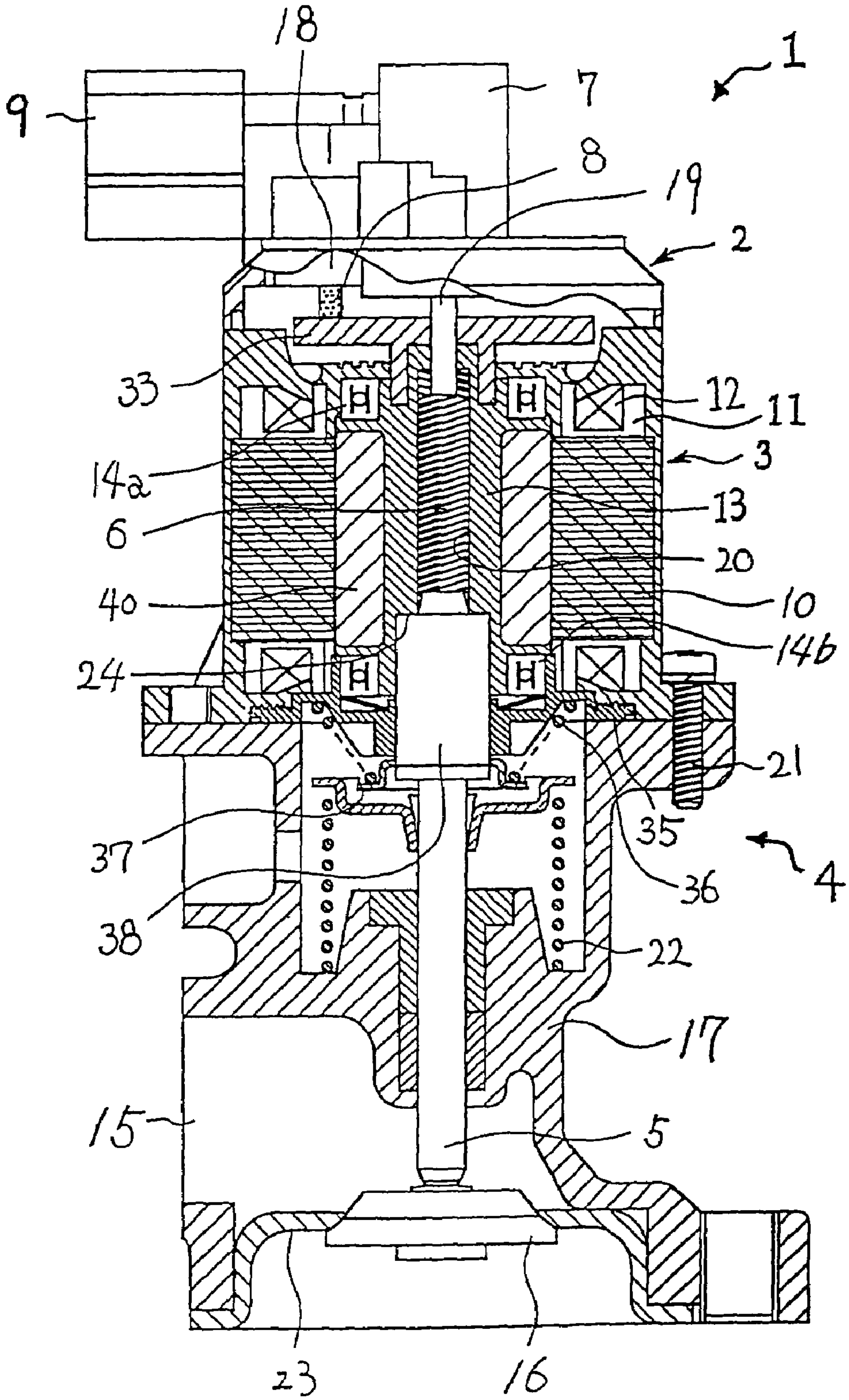
FIG. 1 is a sectional view of an EGR-V in which a motor according to Embodiment 1 of the present invention is used.
Figure 2:
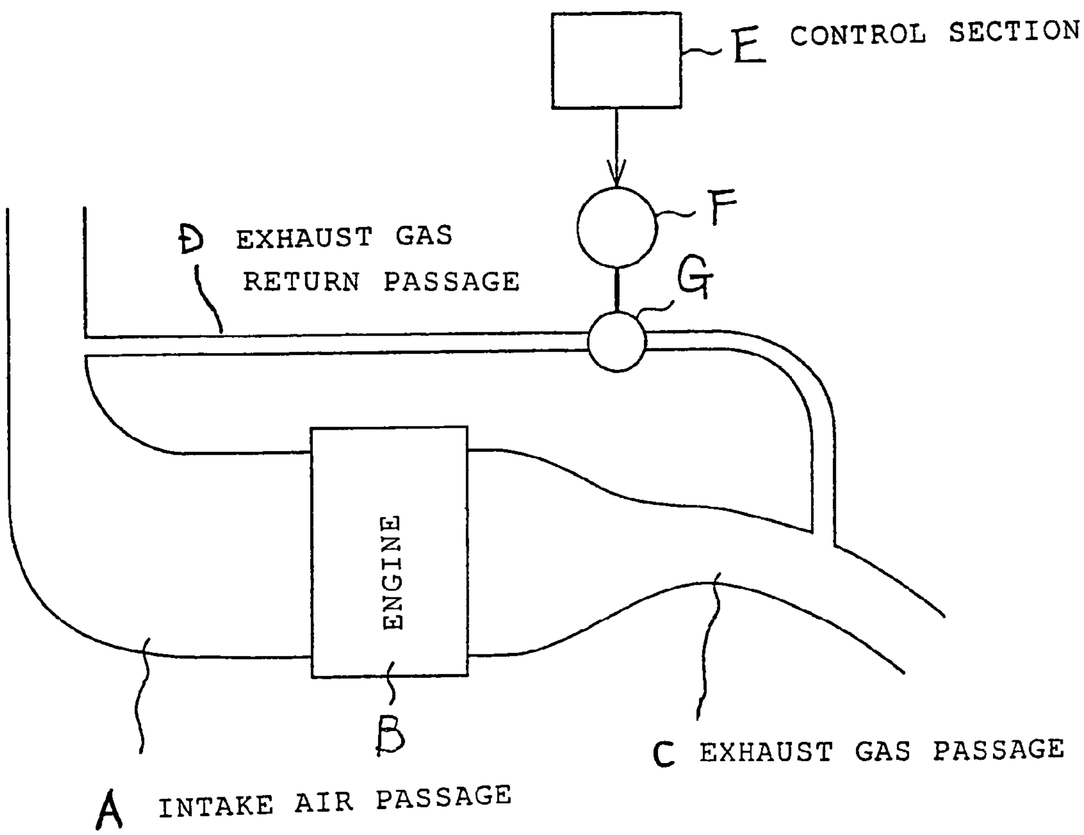
FIG. 2 is an explanatory diagram for explaining an EGR system.
Figure 3:
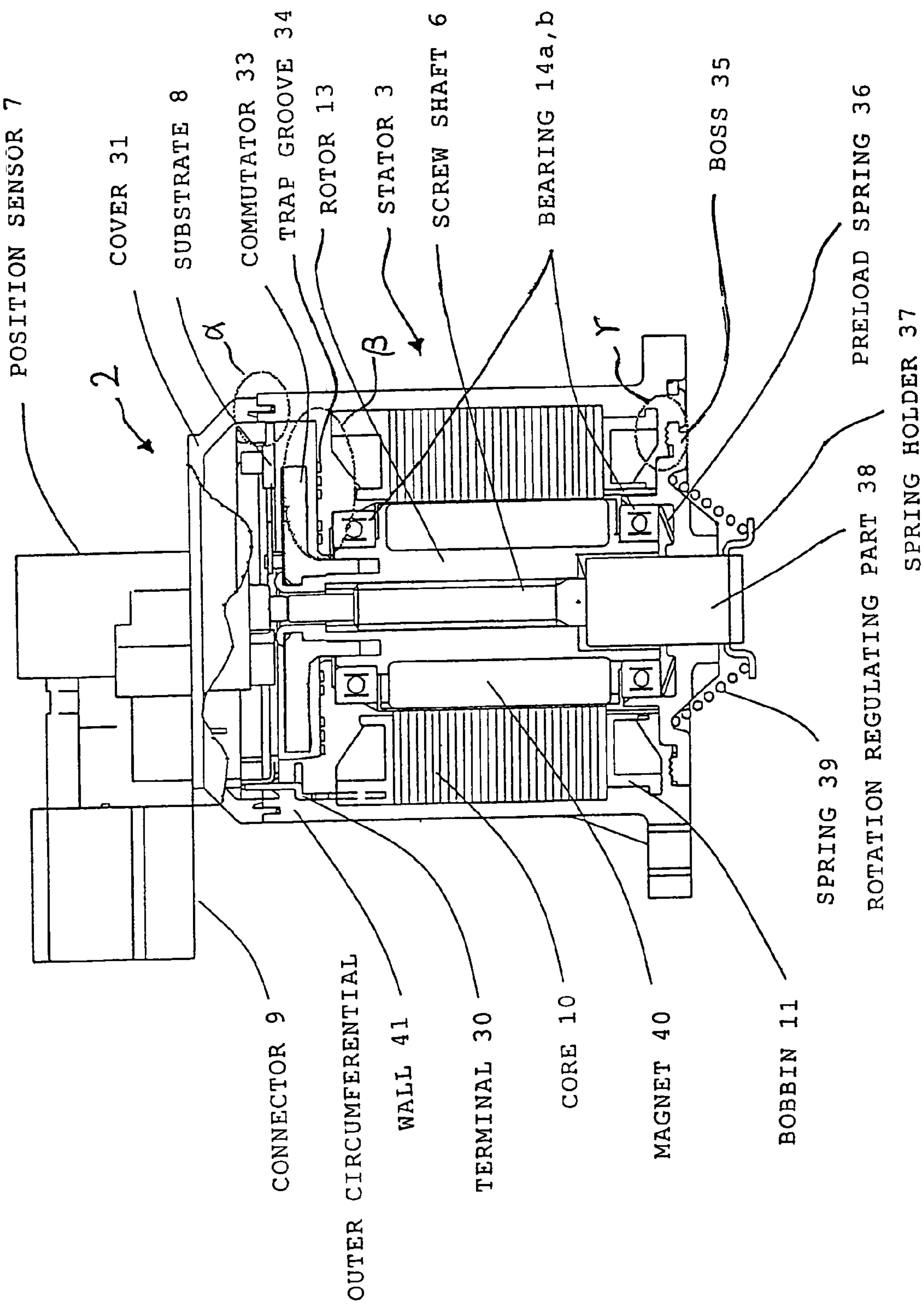
FIG. 3 is a partially sectional view of a motor portion of the EGR-V.
Figure 4:
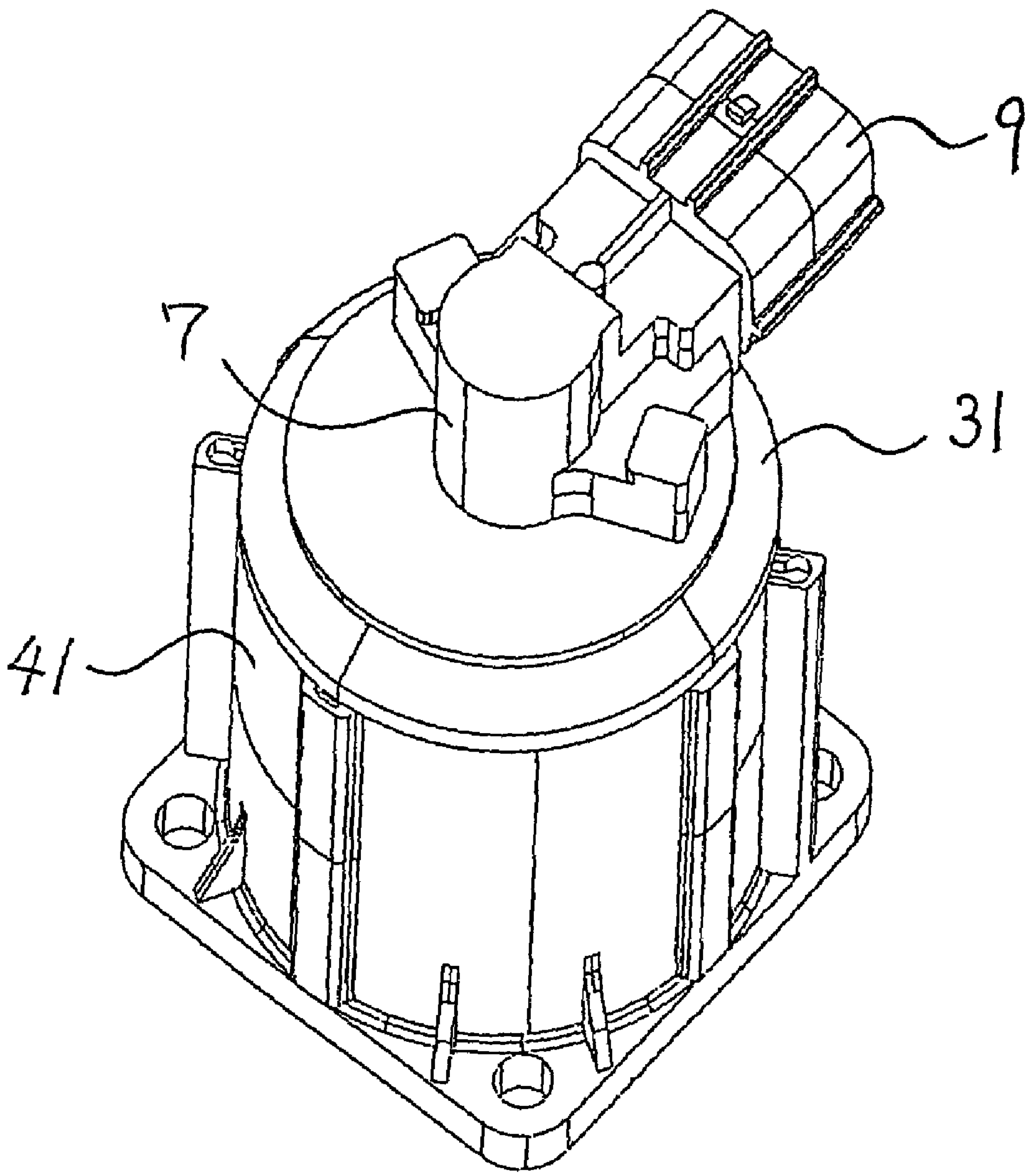
FIG. 4 is an external perspective view of the motor portion.

FIG. 1 is a sectional view of an EGR-V in which a motor according to Embodiment 1 of the present invention is used, and FIG. 2 is an explanatory diagram for explaining an EGR system. FIG. 3 is a partially sectional view of a motor portion of the EGR-V, and FIG. 4 is an external perspective view of the motor portion.

Figure 5:
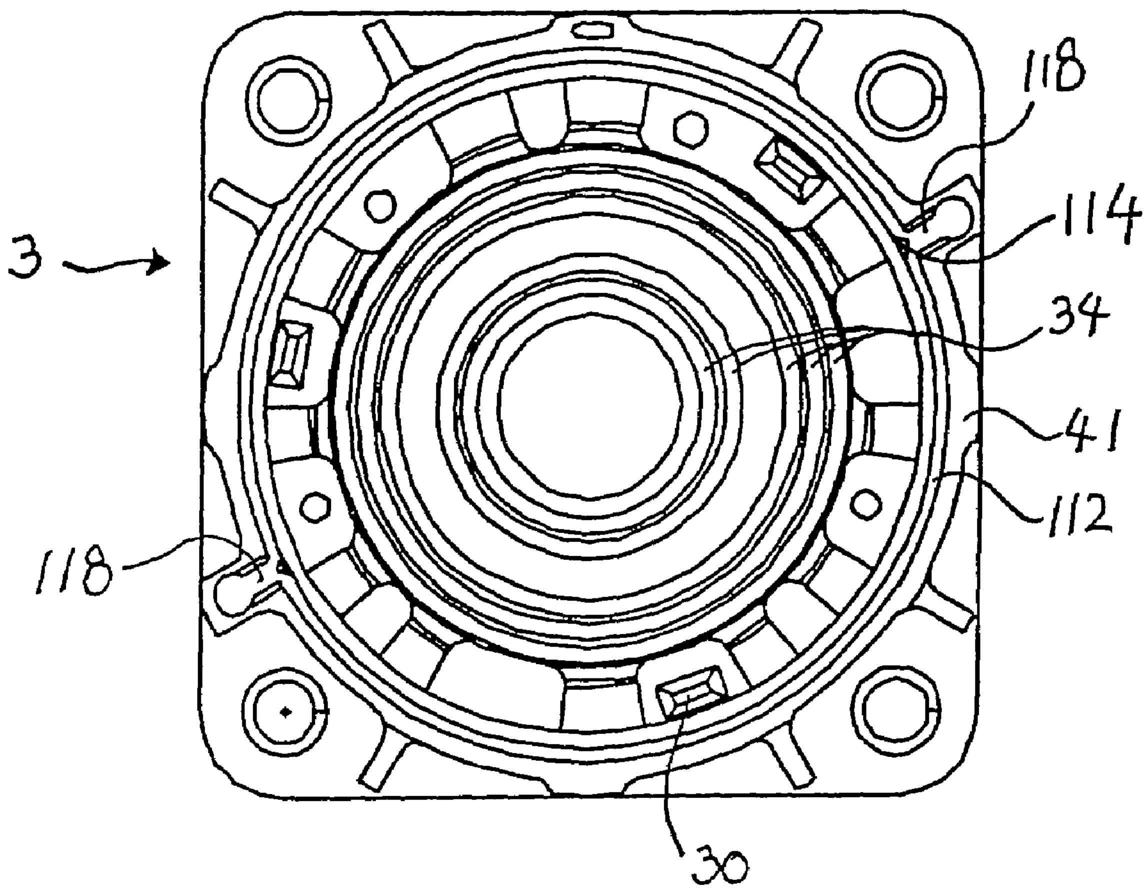
FIG. 5 is a top view of a stator portion according to Embodiment 1.
Figure 6:
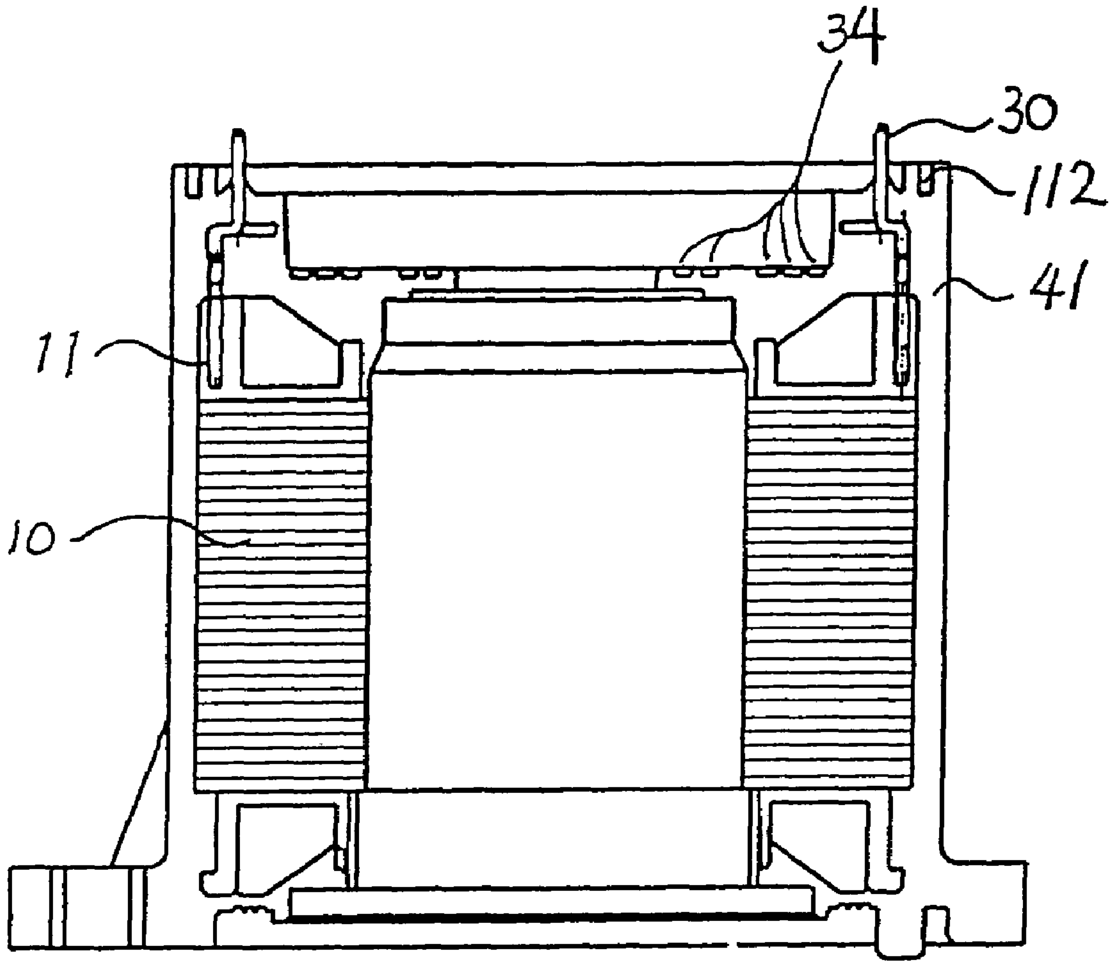
FIG. 6 is a sectional view of the stator portion.

FIG. 5 is a top view of a stator portion according to Embodiment 1, and FIG. 6 is a sectional view of the mentioned stator portion.

Figure 7:
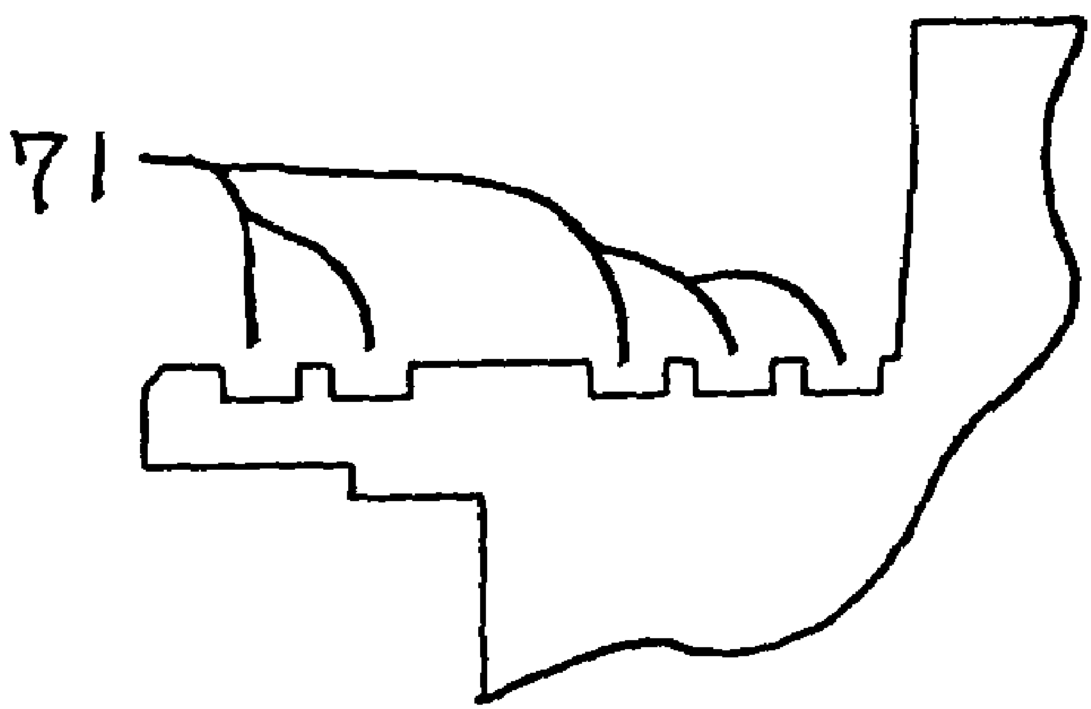
FIG. 7 is a sectional view showing a configuration of an upper face of the stator portion.
Figure 8:
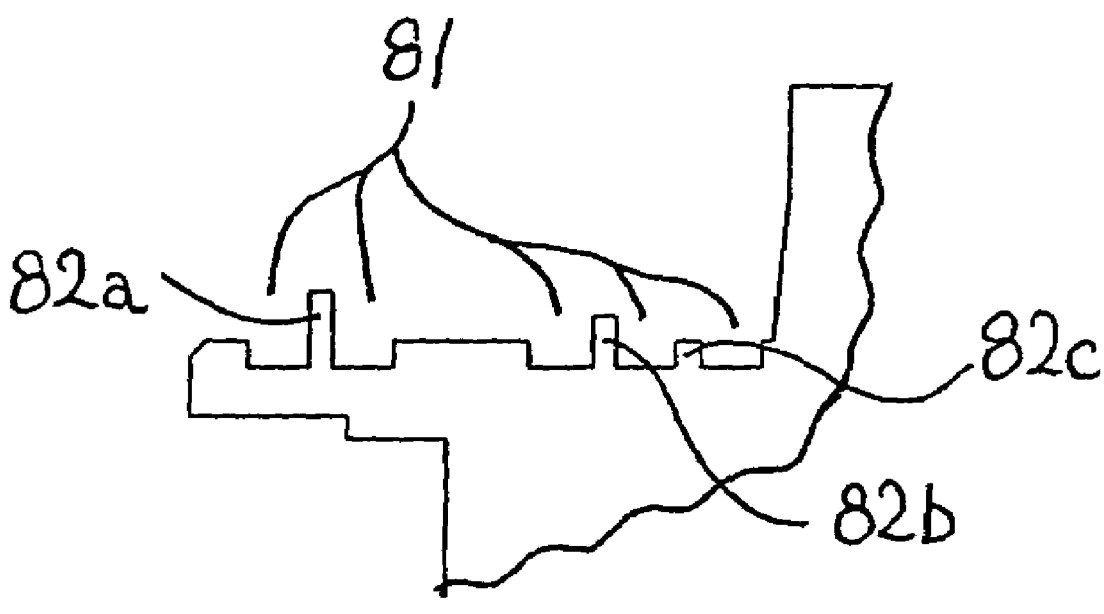
FIG. 8 is a sectional view showing a configuration of the upper face of the stator portion.
Figure 9:
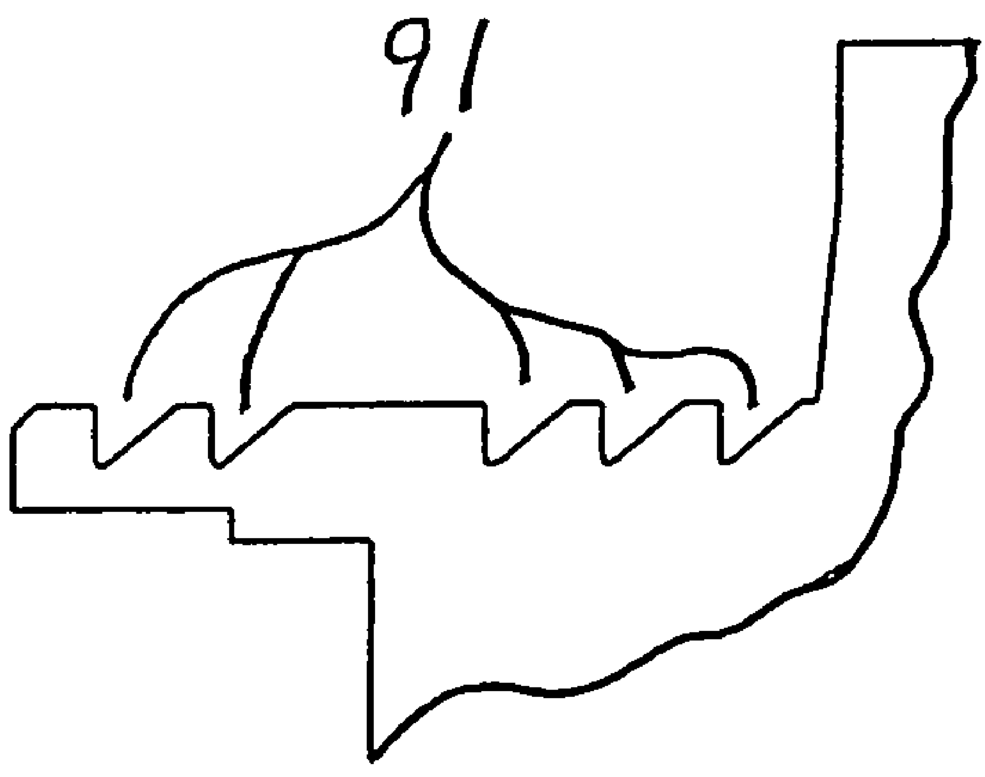
FIG. 9 is a sectional view showing a configuration of the upper face of the stator portion.

FIGS. 7, 8, and 9 are sectional views of modifications each showing a configuration of an upper face of the stator portion.

Figure 10:
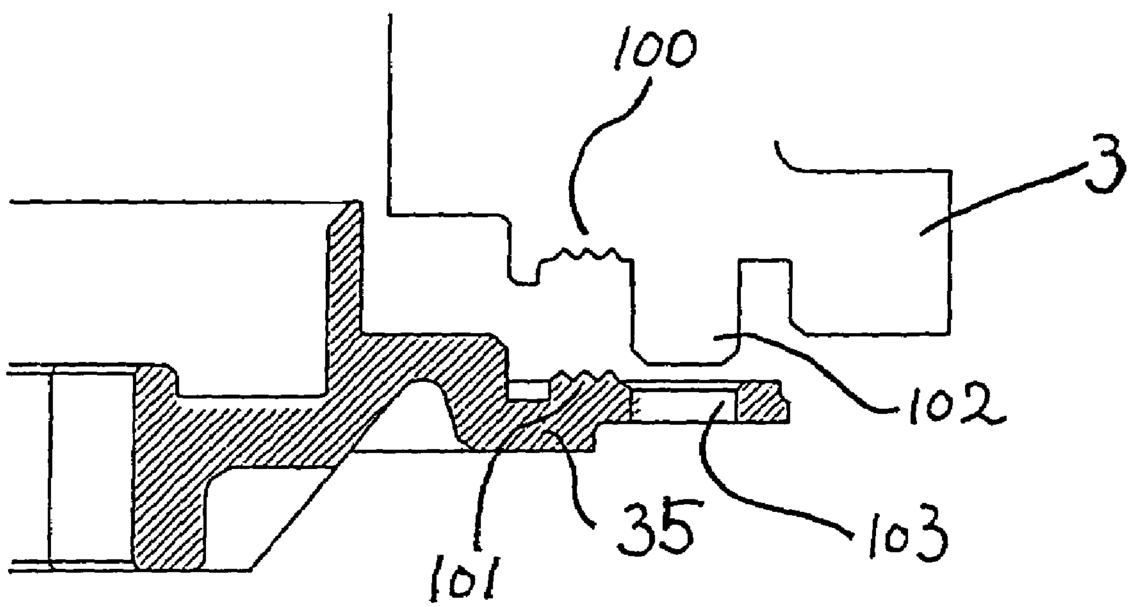
FIG. 10 is a sectional view showing a structure of fitting a boss to a lower part of the stator.

FIG. 10 is a sectional view showing a structure of fitting a boss to a lower part of the stator.

Figure 11:
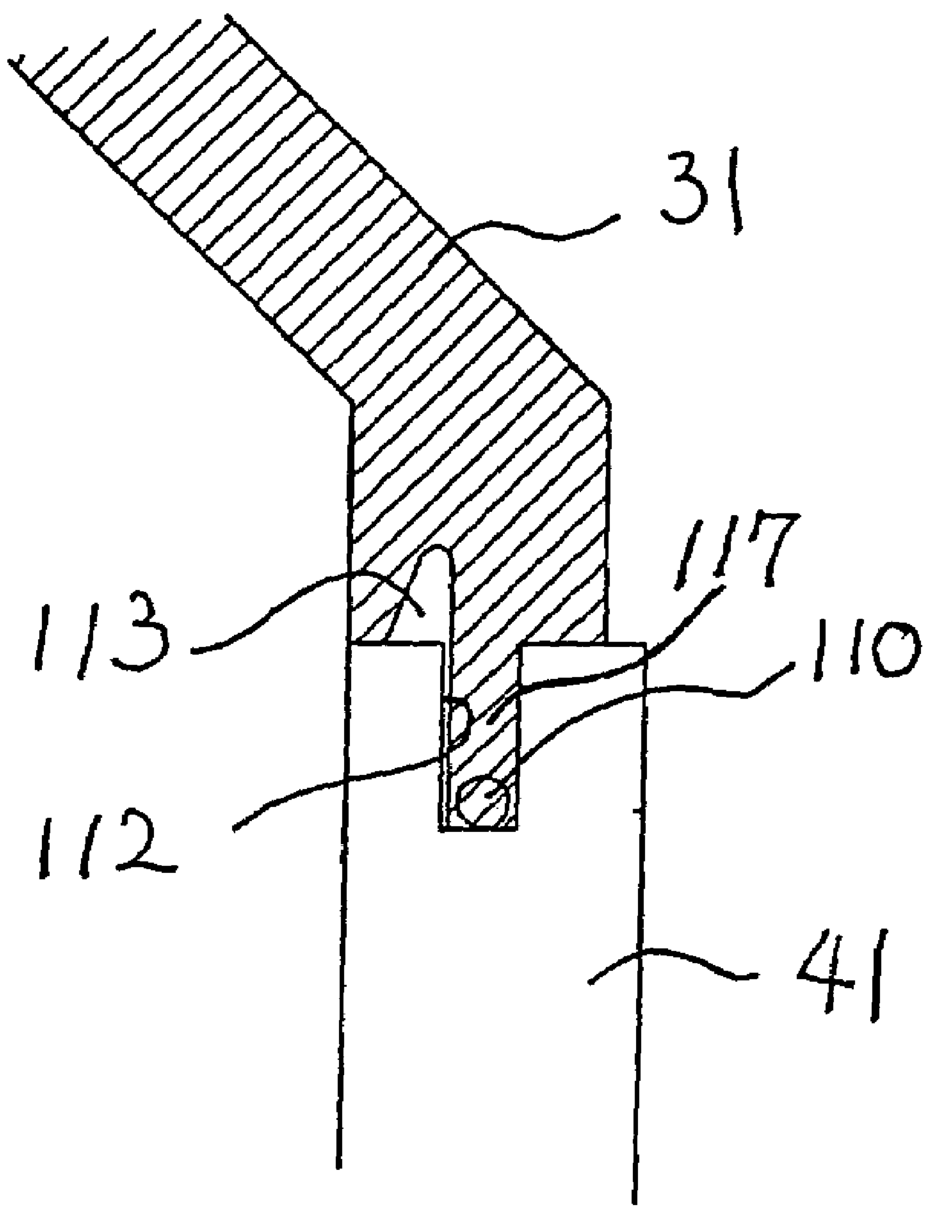
FIG. 11 is an explanatory view for explaining soldering a cover of an energizing part and an outer wall of the stator together.
Figure 12:
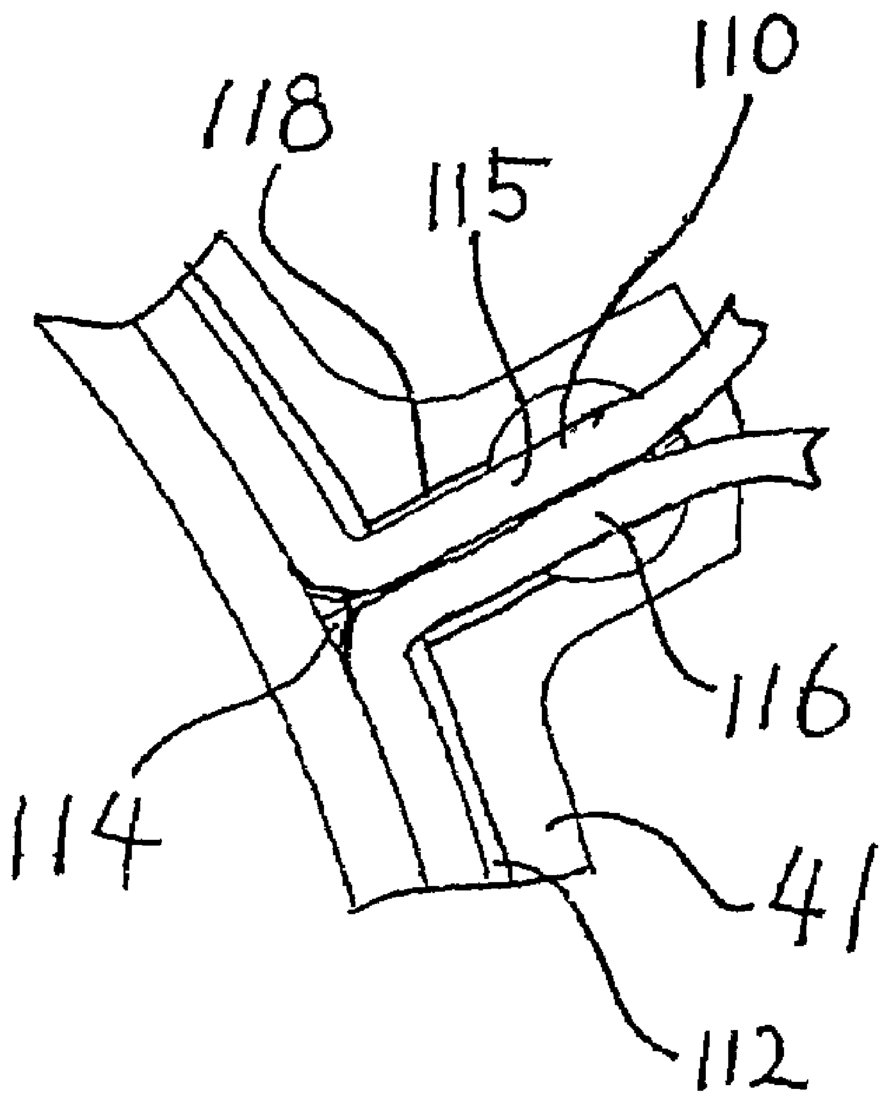
FIG. 12 is a view for explaining a portion where a wire is led out.
Figure 13:
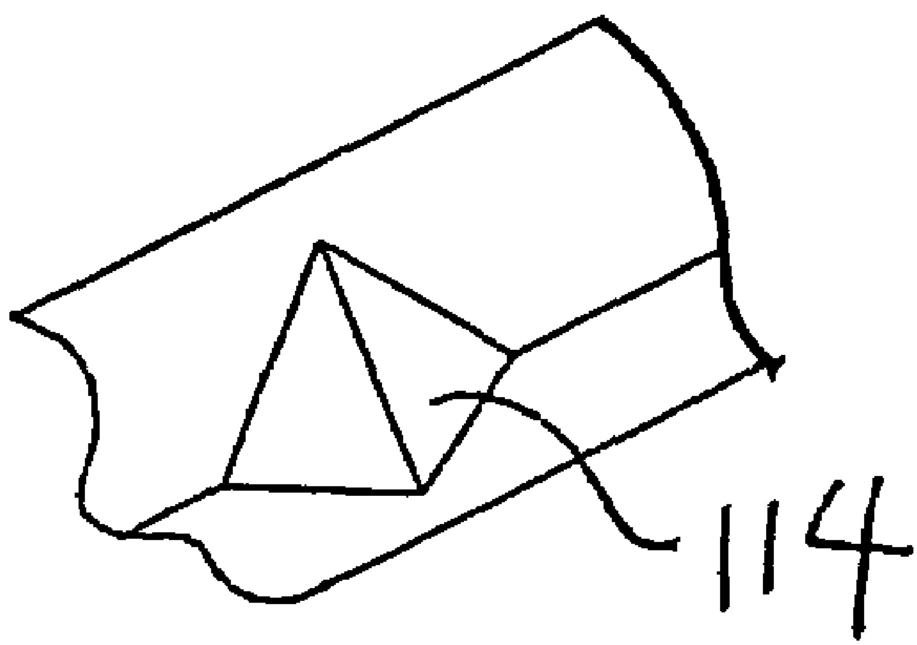
FIG. 13 is a perspective view showing a protrusion formed at the portion where a wire is led out.
Figure 14:
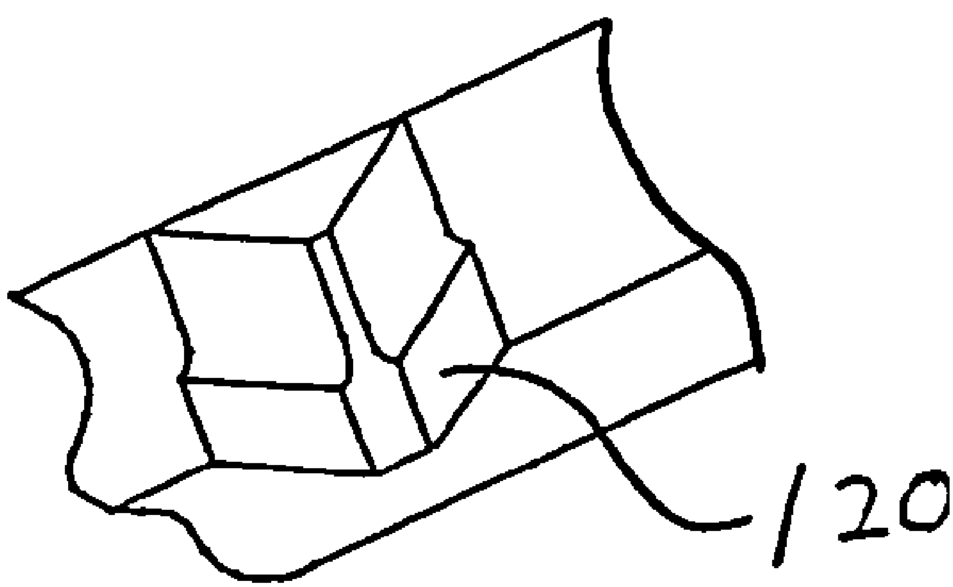
FIG. 14 is a perspective view showing a protrusion formed at the portion where a wire is led out.
Figure 15:
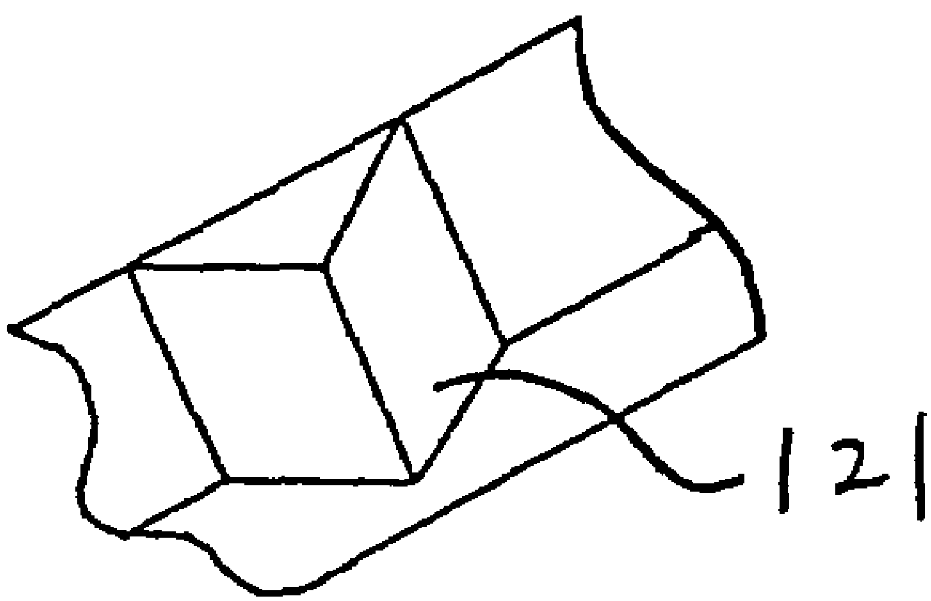
FIG. 15 is a perspective view showing a protrusion formed at the portion where a wire is led out.
Figure 16:
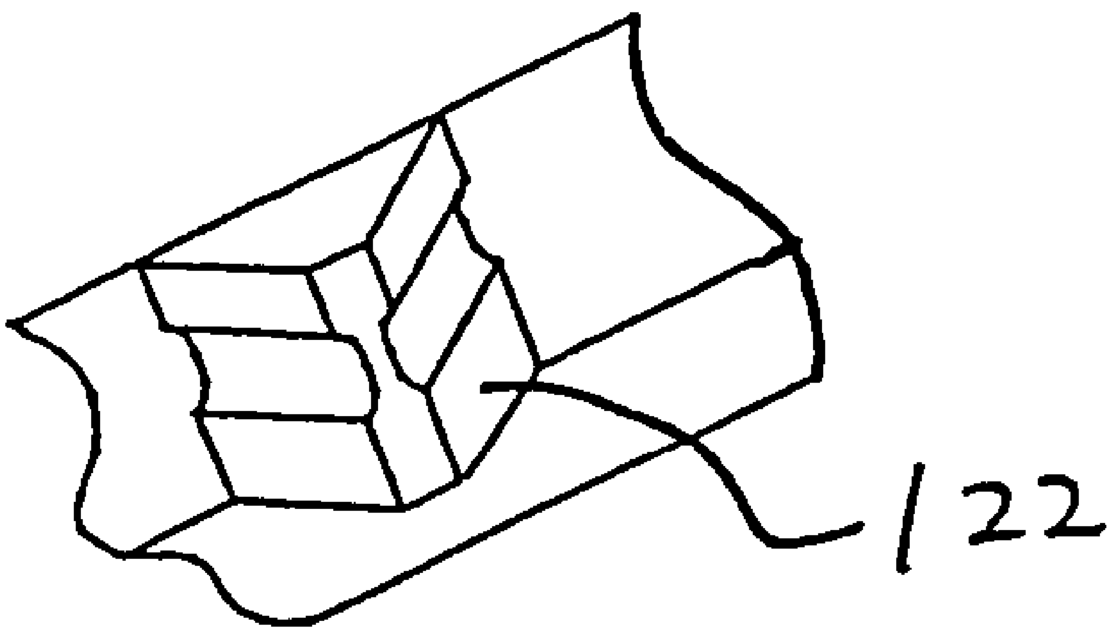
FIG. 16 is a perspective view showing a protrusion formed at the portion where a wire is led out.
Figure 17:
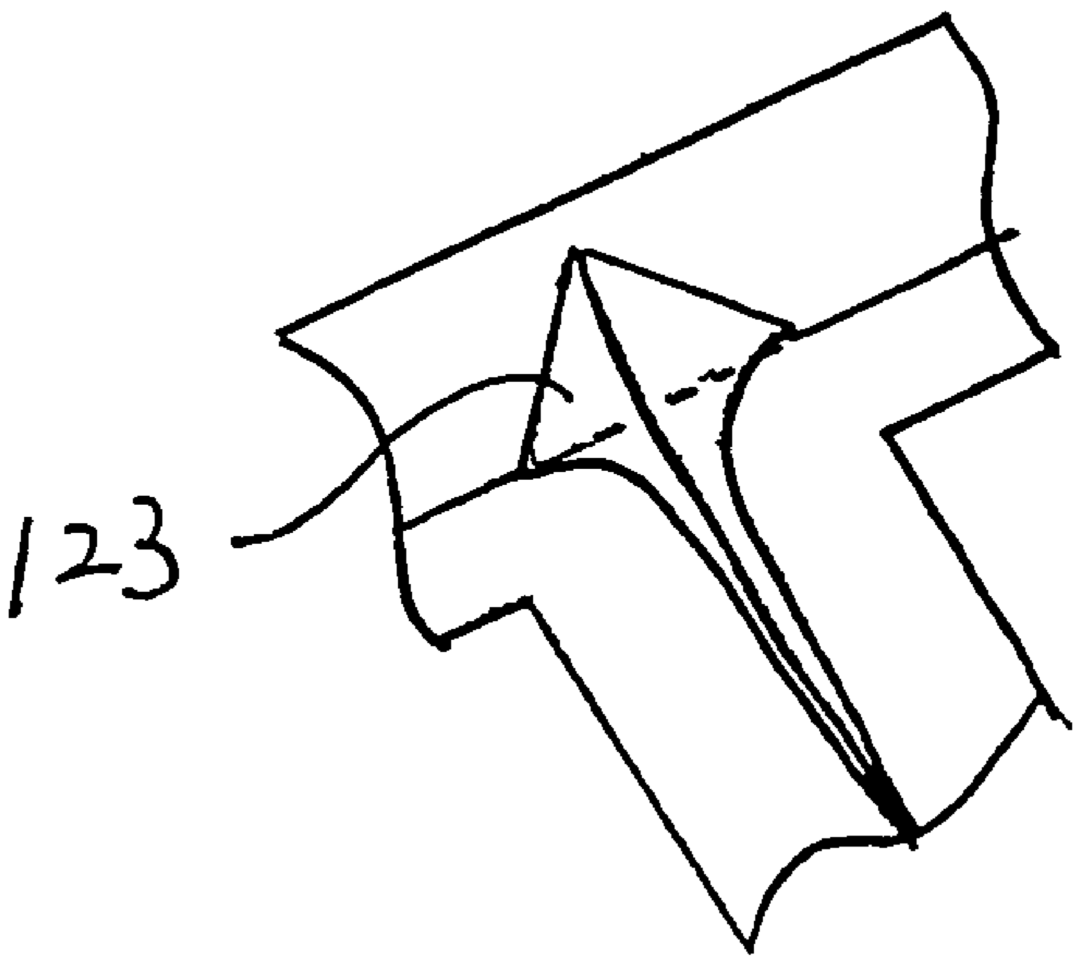
FIG. 17 is a perspective view showing a protrusion formed at the portion where a wire is led out.

FIG. 11 is an explanatory view for explaining how a cover of an energizing part and an outer wall of the stator are welded together, and FIG. 12 is a view for explaining a portion where a wire is led out.

FIGS. 13 to 17 are perspective views of modifications each showing a protrusion formed at the portion where a wire is led out.

Figure 18:
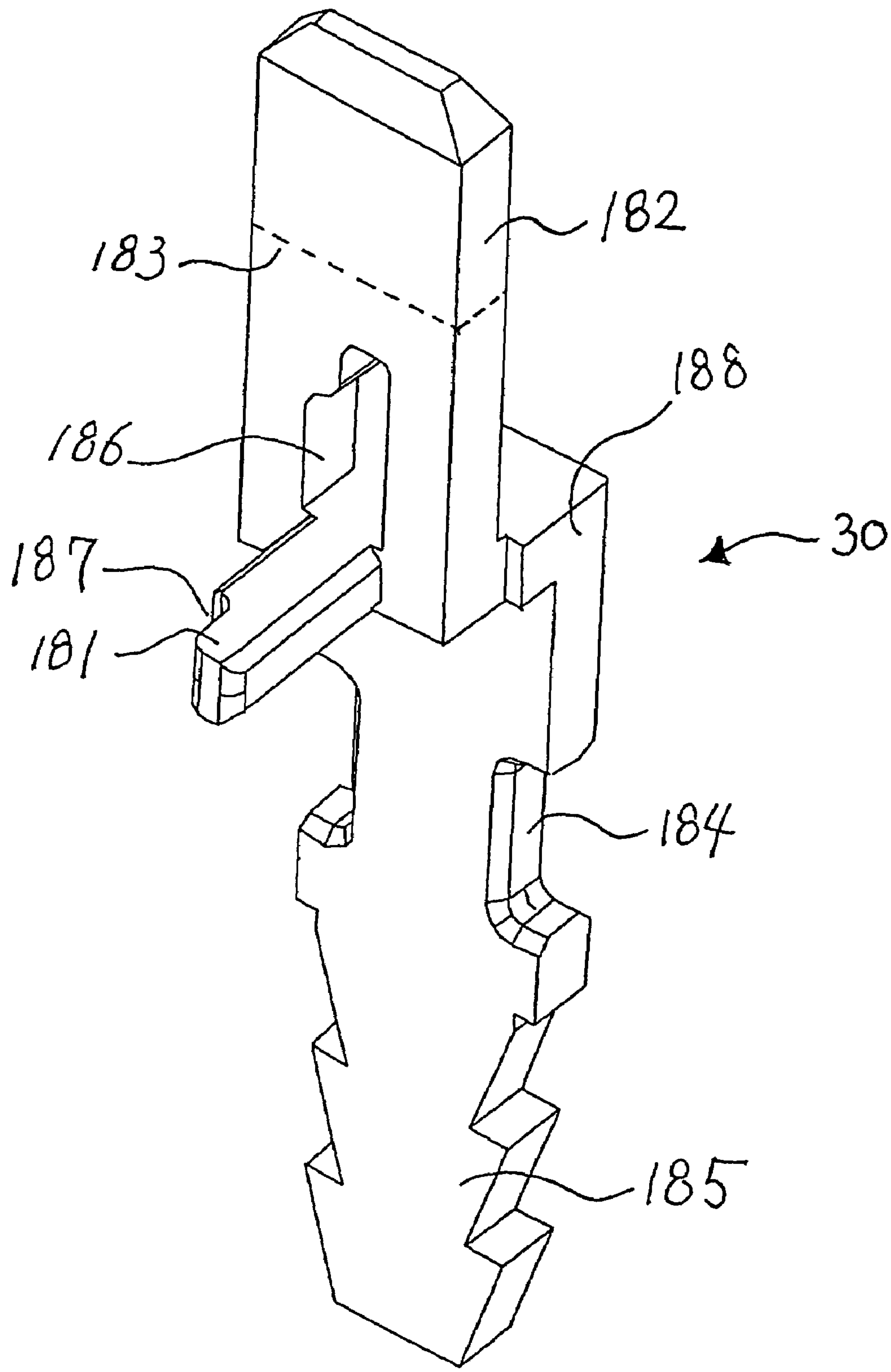
FIG. 18 is a perspective view showing a terminal.
Figure 19:
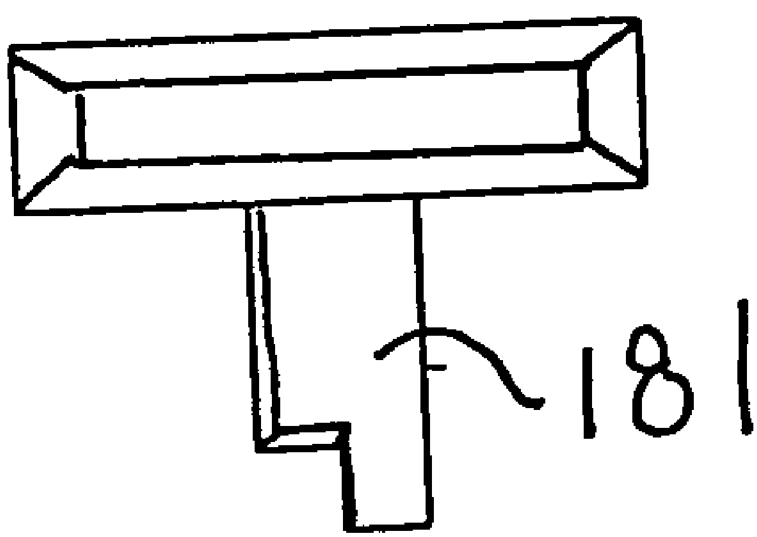
FIG. 19 is a top view showing a modification of the protruding terminal.
Figure 20:
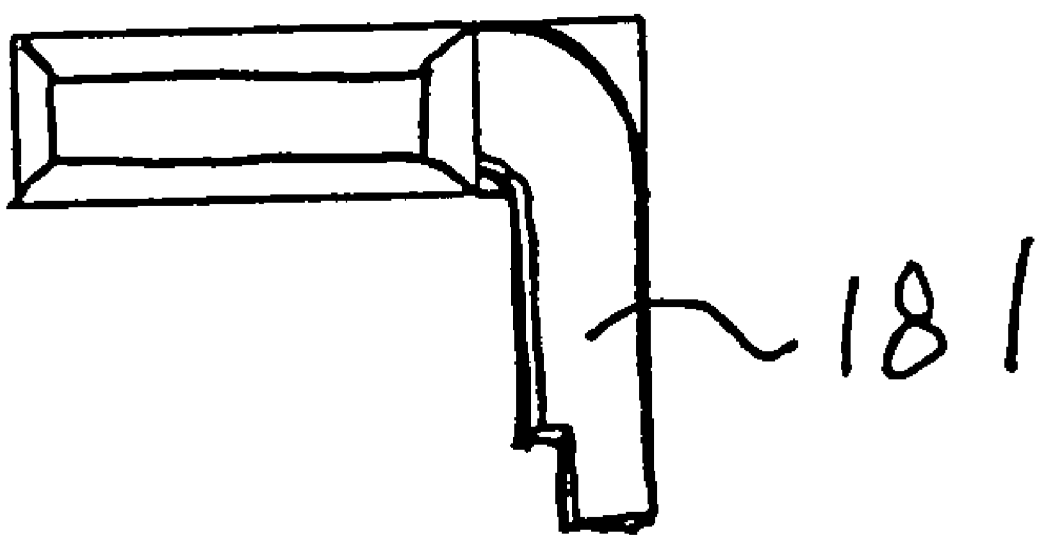
FIG. 20 is a top view showing a modification of the protruding terminal.

FIG. 18 is a perspective view showing a terminal, and FIGS. 19 and 20 show modifications of the protruding terminal.

Figure 21:
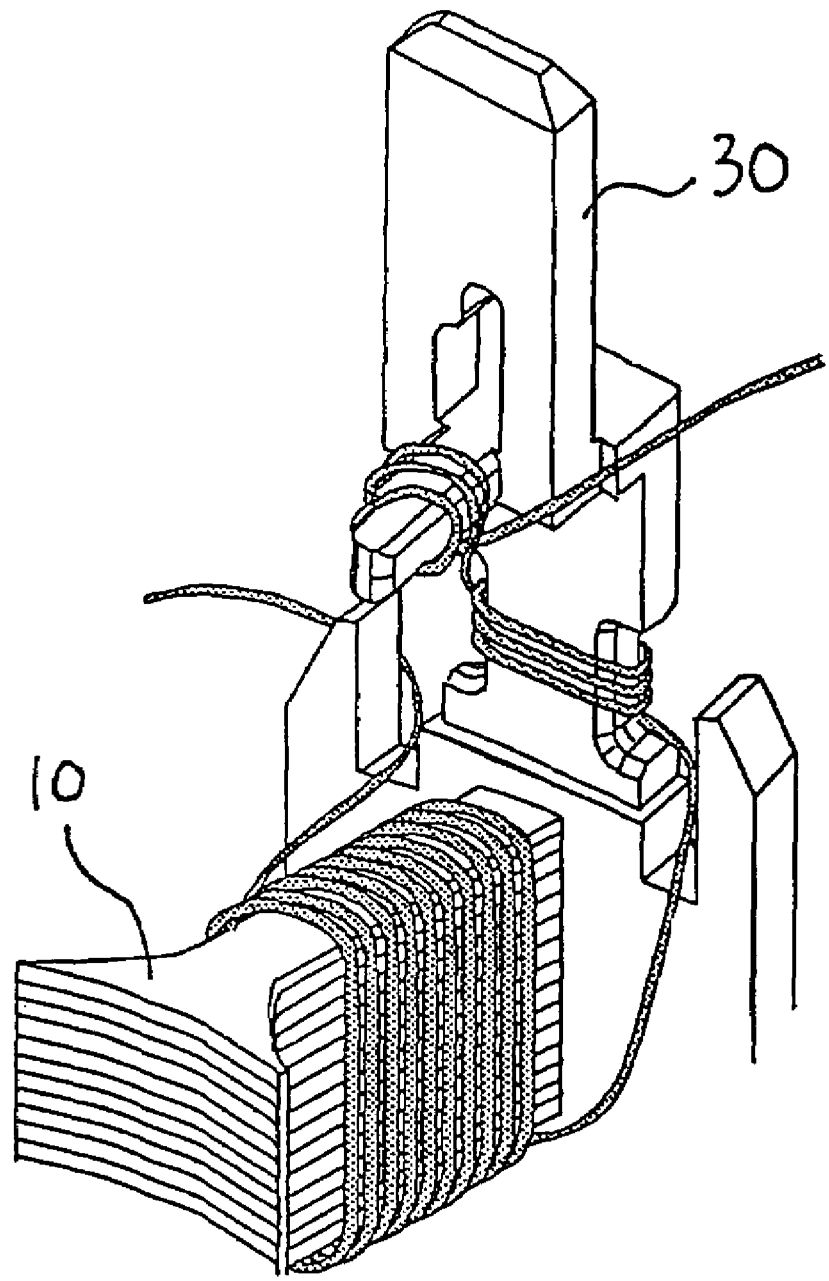
FIG. 21 is an explanatory perspective view for explaining winding round the terminal.
Figure 22:
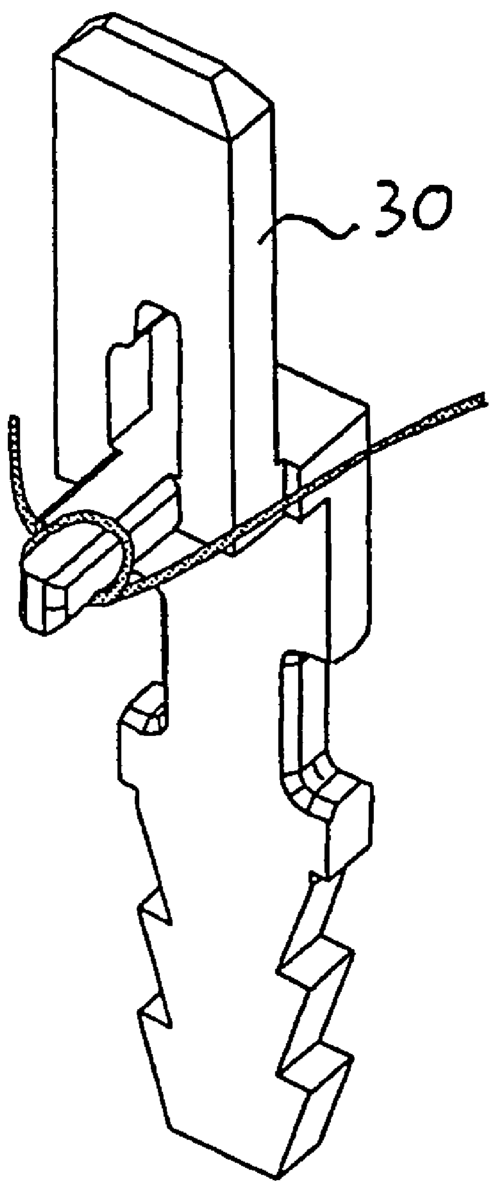
FIG. 22 is an explanatory perspective view for explaining a state under winding.
Figure 23:
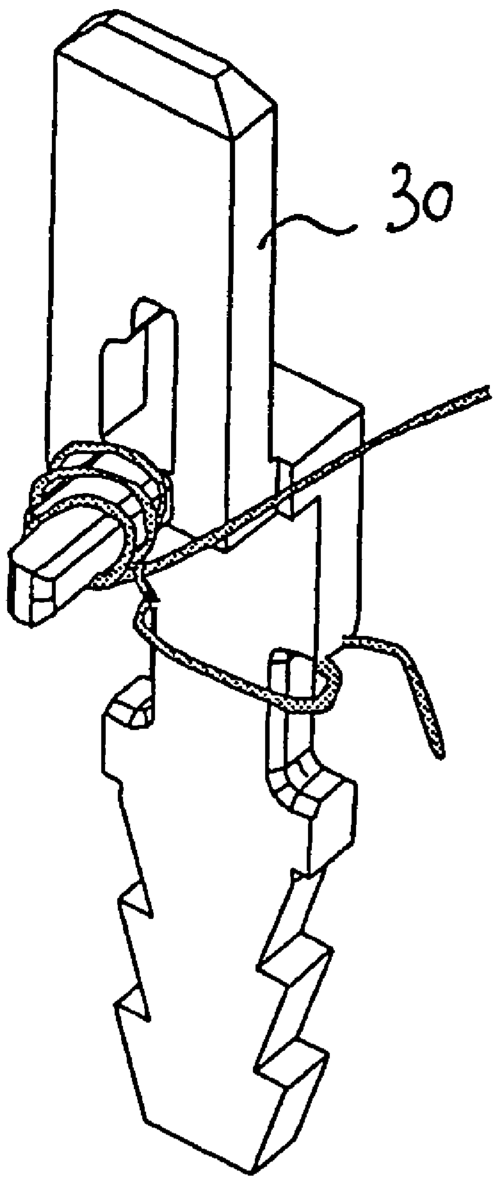
FIG. 23 is an explanatory perspective view for explaining a state under winding.

FIG. 21 is an explanatory perspective view for explaining winding round the terminal, and FIGS. 22 and 23 are explanatory perspective views each for explaining a state under winding.

Figure 24:
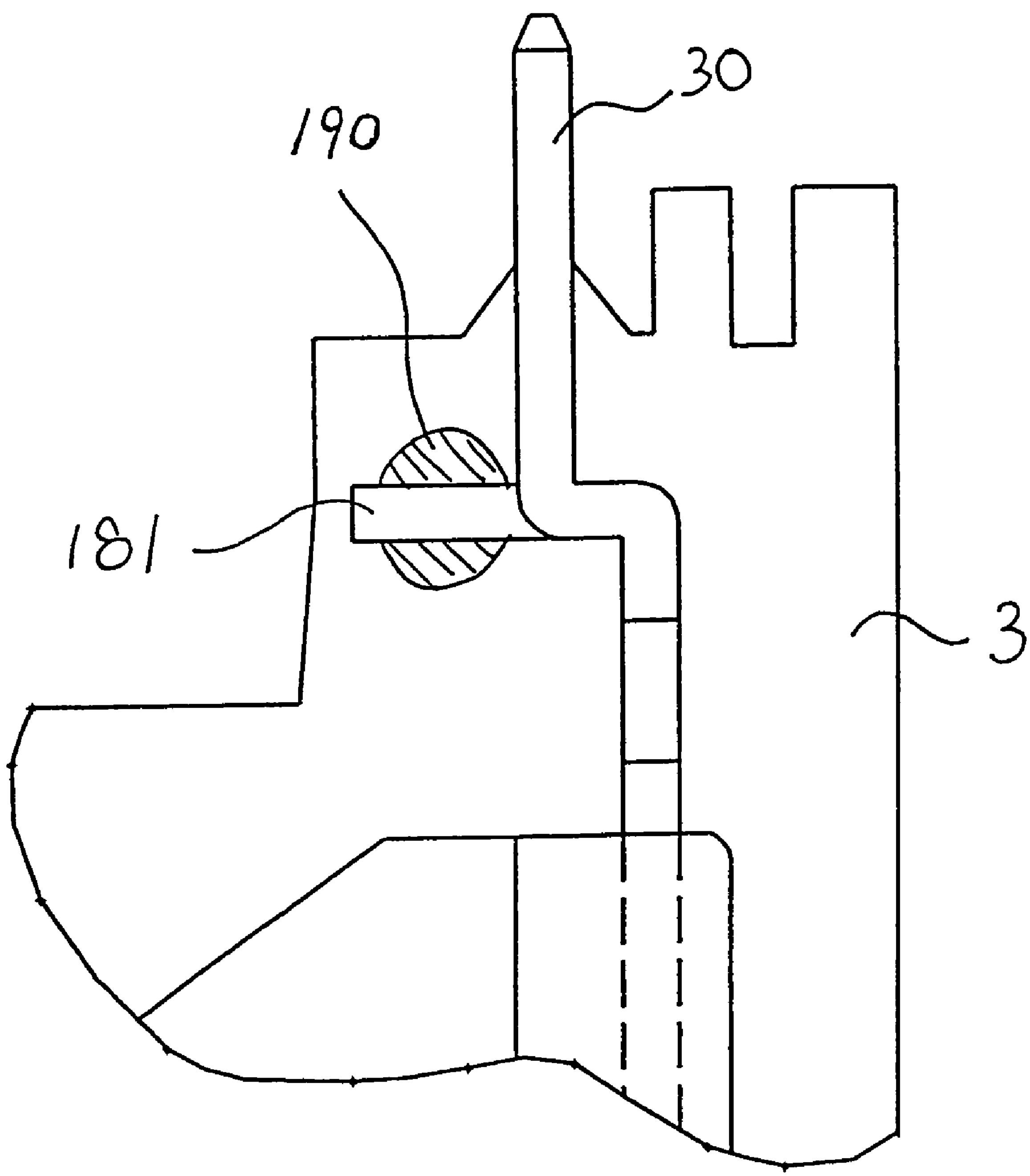
FIG. 24 is an explanatory diagram showing a state that the terminal and the stator are integrally molded.

FIG. 24 is an explanatory diagram showing a state that the terminal and the stator are integrally.

In these drawings, reference numeral 1 is an EGR-V, and numeral 2 is an energizing part. This energizing part 2 is provided with a position sensor 7 that detects a position of a screw shaft 6 in a motor part 3 in order to detect a position of a valve shaft 5, a brush 18 that supplies a power to a coil of the direct-current motor 3, and a substrate 8 that performs current control and other operations. The energizing part 2 is also provided with a connector part 9 that connects a power supply line and a signal line of the position sensor to outside.

Numeral 3 is a stator part, and this stator part 3 is provided with a stator core 10, a bobbin 11 fitted to this stator core 10, a coil 12 wound round this bobbin 11. Further the stator part 2 is also provided with a rotor 13 disposed inside thereof with both ends supported by bearings 14*a* and 14*b*. An outer face of the screw shaft 6 is fixedly screw-engaged with an inner face of this rotor 13, whereby the screw shaft 6 moves in axial direction as the rotor 13 rotates.

Numeral 4 is a valve part, and this valve part 4 is provided with a valve 16 for opening and closing an exhaust gas recirculation passage 15, the valve shaft 5 to which this valve 16 is fixed, and a valve housing 17.

Numeral 19 is a detecting shaft of the position sensor 7, numeral 20 is a face where the screw shaft 6 is fixedly screw-engaged with the rotor 13, and numeral 21 is a bolt for fixing the stator 3 to the housing 17. Numeral 22 is a spring for urging the valve shaft 5 in the direction of closing the valve, numeral 23 is a valve seat on which the valve 16 is seated.

An exhaust gas recirculation system for vehicle is hereinafter described with reference to FIG. 2.

In this drawing, an air taken in from an intake air passage A passes through an engine B and is discharged as an exhaust gas from an exhaust gas passage C. In this process, a part of the exhaust gas is returned (recirculated) to the intake air passage A through an exhaust gas return passage D in order to lower combustion temperature in the engine and reduce NOx.

In this process, it is necessary to control the amount of exhaust gas to be recirculated conforming to an operating state of the engine, and therefore a control section E makes a control of a motor F so as to control opening of a valve G.

Referring to FIG. 3, numeral 30 is a terminal disposed in the stator 3 in order to connect the coil 12 to the energizing part 2, and numeral 31 is a cover of the energizing part 2 welded to an outer circumferential wall 41 of the stator at a portion indicated by the dot-line enclosure α. Numeral 33 is a commutator for supplying the coil 12 with a power generated when the brush 8 comes in contact and slides. Numeral 34 is plural trap grooves (five grooves in this example) formed circumferentially on the upper face of the stator in order to prevent powder produced by abrasion due to sliding of the brush 8 from entering into the stator. For the convenience of explanation, the vicinity of the trap grooves 34 is enclosed by a dot-line enclosure β. Numeral 35 is a boss, and this boss 35 is inserted in and fixed to a lower part of the stator 3, and fixes the bearing 14*b* supporting the rotor 13 with an inner circumferential portion thereof. Furthermore, a rectangular hole is formed at the center, and a rotation regulating part 38 having a rectangular configuration in section is inserted into this rectangular hole, thereby constituting a part of a rotation/direct-acting changeover mechanism between the rotor 13 and the screw shaft 6.

Numeral 36 is a preload spring, and this preload spring 36 gives an impetus to and performs positioning of the rotor 13 through the bearing 14*b* supporting the rotor 13.

Numeral 37 is a holder for holding a spring 39, and the spring 39 gives an impetus to the rotation-regulating part 38 downward in FIG. 3.

Numeral 40 is a magnet that is a permanent magnet fixed to the rotor 13.

As shown in FIG. 5, the trap grooves 34 are formed circumferentially on the upper face of the stator 3.

As shown in FIG. 6, a part of the terminal 30 protrudes from the stator, and the remaining part is integrally molded at the time of molding the stator 3.

FIG. 7 shows a modification provided with trap grooves 71 wider than the trap grooves 34, and FIG. 8 shows another modification in which partition walls 82 of various heights are formed between trap grooves 81. That is, a partition wall 82 located nearer the inside is higher, and a relation is established such that a partition wall 82*a*>a partition wall 82*b*>a partition wall 82*c*.

In FIG. 9, unlike the flat bottoms of the trap grooves 34, trap grooves 91, each having a cutout V-shaped configuration in section, are formed. Slopes of the trap grooves 91 are sharp on the inner side and gentle on the outer side so that entrance of powder produced by abrasion from outside may be caught more exactly and hardly drops out of the trap grooves 91 owing to such configuration.

It is also preferable that the trap grooves are different in depth and, furthermore, it is also preferable that a groove located nearer the inside is deeper.

Now, mounting structure of the boss 35 on the lower part (lower face) of the stator 3 is described with reference to FIG. 10.

The stator 3 and the boss 35 are respectively provided with irregular (rough) parts 100 and 101, and a fluid sealant is sandwiched between these irregular parts in order to improve air-tightness. When making the irregular parts zigzag, contact area at the time of combining them is increased.

The stator 3 and the boss 35 are respectively provided with a protrusion 102 and a hole 103 for positioning in mounting the boss 35 on the stator 3, and the protrusion 102 is inserted into the hole 103 at the time of mounting.

Now, welding (welding by hot wire method) of the cover 31 of the energizing part 2 onto the outer circumferential wall 41 of the stator 3 is described with reference to FIGS. 11 to 17.

A hot wire 110 is accommodated in a groove 112 provided at an end part of the outer circumferential wall 41. Then, under this situation, a protrusion 117 formed at an end part of the cover 31 is inserted into the groove 112, thus the energizing part 2 is mounted on the stator 3. Then the hot wire 110 is heated by applying an electric current to the hot wire 110, whereby the protrusion 117 and an inner circumferential wall of the groove 112 are fused and welded on each other.

At this time, in order to prevent the fused resin from flowing out the groove 112 through a gap (especially flowing out of the EGR-V), a space (recess) 113 is provided.

Now, referring to FIG. 12, a structure of leading out the hot wire 110 from the groove 112 in order to connect the hot wire 110 to an external power supply is described. The hot wire 110 is comprised of two hot wire members 115 and 116, which are led out from two points on the circumference of the outer circumferential wall 41, as shown in FIG. 5. A groove 118 is provided at the lead-out portion, and along this groove 118 the hot wire 110 is led out.

At the time of welding, the hot wire 110 located at the foregoing pull-out portion is also energized and heated as a matter of course, and the heat of the hot wire 110 fuses the resin also in the vicinity of the lead-out portion. Since it is possible to dispose the hot wire 110 at a predetermined position with the use of a rib 114 and carry out well-balanced fusing of resin, the lead-out portion is welded exactly.

Fusing the rib portion 114 fills up the gap between the hot wire members 115 and 116, and this improves air-tightness in the welding.

There is a wide choice in configuration of the rib 114 such as ribs 120 to 123 shown in FIGS. 14 to 17.

Now, the terminal is hereinafter described with reference to FIGS. 18 to 24.

The terminal 30 is punched out of a sheet metal and formed by press working. Further, a protruding part 181 is formed by punching and a space 186 is also formed by punching. A lower part 185 of the terminal 30 is inserted in and fixed to the bobbin 11. At this time, since the lower part 185 is provided with irregular sides by cutting out, the lower part 185 hardly get out once it is inserted due to such irregularities. The terminal, 30 after being inserted in the bobbin 11, is integrally molded with the core 10, the bobbin 11, and so on into one body. In this process, the mold resin is located at a portion under a dot-line 183 in FIG. 18, and an upper part 182 protrudes from the upper face of the stator. Winding of a coil is round a narrow part 184 and is also wound round the protruding part 181. Furthermore, the protruding part 181 is provided with a cutout portion 187, and this makes it easy to tie the winding into one bundle at the time of winding.

FIGS. 19 and 20 show modifications of the protruding part 181, respectively. FIG. 19 is a top view of the protruding part 181 without a bent part 188 in the middle of the terminal as shown in FIG. 18, and FIG. 20 is a top view of the protruding part 181 formed by bending.

FIGS. 21 to 23 show a procedure for winding the winding, and first, as shown in FIG. 22, winding is started from tying the winding round the cutout portion 187, then the winding is wound round the narrow part 184 as shown in FIG. 23. Subsequently, as shown in FIG. 21, the winding is wound round the core 10.

Next, a soldering point is described with reference to FIG. 24.

Soldering of the terminal 30 is carried out in the area indicated by numeral 190 in the drawing, and therefore the soldering area 190 does not interfere with the mold at the time of molding an outline of the stator 3.

Although a motor for an EGR-V is described in this embodiment, the invention is also applicable to various motors such as motor for adjusting an optical axis of an HID headlight, motor for starting an engine.

INDUSTRIAL APPLICABILITY

As described above, the present invention relates to a motor that is used as a direct-current motor for driving a valve of a vehicle-mounted EGR-V (Exhaust Gas Recirculation Valve), a motor for automatically adjusting an optical axis of a vehicle-mounted HID light, a motor for starting an engine, etc.

What is claimed is:

1. A motor comprising: a brush; a commutator onto which said brush comes in contact and slides; a core round which a coil is wound through a bobbin and in which a magnetic field is generated by applying an electric current from the brush to said coil; and a rotor provided with a magnet;

wherein a recess is formed between a slide face of said brush and said commutator and said rotor in order to prevent powder produced by abrasion due to sliding between said brush and said commutator from moving to said rotor.

2. The motor according to claim 1, wherein the recess is disposed circumferentially around a bearing portion of the rotor.

3. The motor according to claim 1, further comprising a plurality of additional recesses, wherein adjacent ones of said recess and said additional recesses are separated by respective partition walls, and further wherein said partition walls are of various heights.

4. The motor according to claim 1, wherein said recess comprises a V-shape in cross section.

5. The motor according to claim 4, wherein a slope of the V-shape is greater on a side closer to said rotor than that on a side farther away from said rotor.

6. The motor according to claim 1, further comprising one or more additional recesses, wherein the depth of said recess is different from that of said one or more recesses.

7. The motor according to claim 6, wherein the one of said recess and said one or more additional recesses that is closer to said rotor is deeper than the remaining ones of said recess and said one or more additional recesses.

* * * * *